United States Patent
Meyer

(10) Patent No.: US 6,175,735 B1
(45) Date of Patent: *Jan. 16, 2001

(54) MOBILE RADIO COMMUNICATIONS SYSTEM WITH IMPROVED HANDOVER FACILITY

(75) Inventor: Klaus Meyer, Nürnberg (DE)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/727,513

(22) PCT Filed: Feb. 19, 1996

(86) PCT No.: PCT/IB96/00133

§ 371 Date: Oct. 21, 1996

§ 102(e) Date: Oct. 21, 1996

(87) PCT Pub. No.: WO96/26622

PCT Pub. Date: Aug. 29, 1996

(30) Foreign Application Priority Data

Feb. 20, 1995 (DE) .............................. 195 05 780

(51) Int. Cl.[7] ................................. H04Q 7/20
(52) U.S. Cl. ...................... 455/440; 455/444; 455/449
(58) Field of Search .................... 455/436, 437, 455/438–444, 449, 448; 370/331

(56) References Cited

U.S. PATENT DOCUMENTS

| 5,189,734 | * | 2/1993 | Bailey et al. | 455/439 |
|---|---|---|---|---|
| 5,379,446 | * | 1/1995 | Murase | 455/444 |
| 5,396,645 | * | 3/1995 | Huff | 455/441 |
| 5,457,810 | * | 10/1995 | Ivanov et al. | 455/444 |
| 5,509,027 | * | 4/1996 | Vook et al. | 455/437 |
| 5,513,380 | * | 4/1996 | Ivanov et al. | 455/444 |
| 5,530,910 | * | 6/1996 | Taketsugu | 455/444 |
| 5,548,806 | * | 8/1996 | Yamaguchi et al. | 455/441 |
| 5,590,177 | * | 12/1996 | Vilmur et al. | 455/436 |
| 5,623,535 | * | 4/1997 | Leung et al. | 455/444 |
| 5,822,697 | * | 10/1998 | Matsuzawa | 455/443 |
| 5,907,807 | * | 5/1999 | Chavez, Jr. et al. | 455/436 |
| 5,995,835 | * | 11/1999 | De Seze et al. | 455/436 |

OTHER PUBLICATIONS

Chi Wang Sung et al, User Speed Est. and Dynamic Channel Allocation in Hierarchical Cell Sys., Dep't of Info. Eng., The Chinese Univ., Hong kong, Jun. 1994.*

* cited by examiner

*Primary Examiner*—Reinhard J. Eisenzopf
*Assistant Examiner*—Charles N. Appiah

(57) ABSTRACT

The mobile radio communication system includes a plurality of base stations and call hand over units controlling which of the base stations services a call from a mobile station. When deciding whether to hand over a call from a first base station to a second base station, both serving microcells, the call hand over units hand the call over to a third base station, serving a macrocell, based on a duration of the call regardless of changes in radio coverage of the second base station. Also, the hand over units decide whether to hand over a call from a macrocell base station to a microcell base station based on a length of time the mobile station has been within a coverage area of the microcell base station regardless of changes in radio coverage of the microcell base station.

16 Claims, 5 Drawing Sheets

MOBILE RADIO COMMUNICATIONS SYSTEM WITH IMPROVED HANDOVER FACILITY

BACKGROUND OF THE INVENTION

1. Field of the Invention

The invention relates to a mobile radio communications system, a base station and a controller for such a mobile radio communications system, and also to a method of handing over a call.

2. Description of Related Art

Contemporary cellular mobile radio communications systems are generally formed by a plurality of base stations, in which each base station can be linked to a given number of subscriber stations (=mobile stations) whose locations may change inside a certain geographical area. Such a geographical area will be referenced radio coverage area or radio cell in the following. The radio coverage areas of individual base stations in the mobile radio communications system may then be so large that they cover radio coverage areas of other base stations. As a result, the respective geographical areas of radio cells of different sizes may be covered several times. Depending on the size of the geographical area, the radio cells or radio coverage areas may then be combined to individual hierarchical cell layers. Once a mobile subscriber station moves away from the radio coverage area of a base station with which it is just having a telephone call, care has to be taken that the call to the mobile subscriber station is taken over by another radio cell, i.e. by another base station. The occurrence of such a change of radio cells may be detected, for example, by measurements of the signal field strength, the signal-to-noise ratio, the bit error rate, the distance between base station and mobile subscriber station, and so on. If such a situation is detected, a call handover or handoff may be necessary.

EP 526 436 A1 proposes a method of call handover for a mobile radio communications system with various cell layers. A criterion for a call handover is used the speed of the relevant mobile subscriber station.

SUMMARY OF THE INVENTION

It is an object of the invention to provide a mobile radio communications system of the type defined in the opening paragraph, in which improved use of the individual radio coverage areas is possible.

This object is achieved with a mobile radio communications system of the type defined in the opening paragraph, in that the mobile radio communications system comprises means for handing over a call between a base station and a mobile station in dependence on the dwell time of the mobile station in a radio coverage area and/or in dependence on the duration of the call.

It is possible for a call to be handed over from the coverage area of a base station to the coverage area of the further base station without considerable additional expenditure, in that the dwell time or the duration of the call of a mobile station can be simply determined, for example, by a counter, without the necessity of having a costly detection of, for example, the speed of the mobile station. All the radio cells i.e. all the radio coverage areas of the mobile radio communications system are then identified by their respective cell layers and can thus be assigned to a specific cell hierarchy. Consequently, the call is released, i.e. the call handover is triggered in dependence on the type of cell, that is to say, in accordance with the respective hierarchy of the cell of origin, and the dwell time of a call in the coverage area of the respective destination cell, and while the identification of the destination cells of the respective cell layers is taken into consideration. In addition, in dependence on the type of cell, that is to say, in accordance with the respective hierarchy of the cell of origin and the duration of a call from a mobile station to the base station of the cell of origin, and while the identification of the destination cells of the respective cell layers is taken into consideration, a call can be handed over to the further base stations which also cover the radio coverage area. By taking the call duration in a cell of origin into consideration, the call handover can be suppressed in dependence on the type of the respective cell if also further means in the system can be used to remove the reason why a call is triggered. On the whole, by taking the dwell time and/or the call duration into consideration, a call is thus handed over fast, the destination cells are selected reliably and individual radio coverage areas are used with maximum efficiency.

An effective control of the call handover is ensured when the mobile station is connected to the base station of a higher-order cell layer, that is, a macro cell or umbrella cell, in that the mobile radio communications system has at least two layers of a cell hierarchy, and in that means are provided for handing over a call which exists between a base station and a mobile station in dependence on the dwell time of the mobile station in a radio coverage area, if a call is handed down to a radio station of a lower-order layer of the cell hierarchy.

The control of the call handover in dependence on the dwell time may then be effected in that the means for handing over a call which exists between a base station and a mobile station in dependence on the duration of the call are provided if the duration of the call exceeds a predefinable first value.

Accordingly, an effective control of the call handover is ensured when the mobile station is connected to the base station of a lower-order cell layer, i.e. micro cell or macro cell, in that the mobile radio communications system has at least two layers of a cell hierarchy, and in that the means for handing over a call which exists between a base station and a mobile station in dependence on the duration of the call are provided if a call is handed up to a radio station of a higher-order layer of the cell hierarchy.

The control of a call handover in dependence on the duration of the call may in that case be effected in such a way that the means for handing over a call which exists between a base station and a mobile station in dependence on the duration of the call are provided if the duration of the call falls short of a predefinable first value.

A highly reliable control of the call handover is effected in that the mobile radio communications system comprises further means for handing over a call in dependence on predefinable criterions, more particularly, criterions with respect to layer, distance and/or quality.

For an effective implementation of the handing over of a call, it is advantageous that the mobile radio communications system comprises means for identifying an assignment of the base stations of the mobile radio communications system to at least two hierarchical layers.

These and other aspects of the invention will be apparent from and elucidated with reference to the embodiments described hereinafter.

DETAILED DESCRIPTION OF THE PREFERRED EMBODIMENTS

Figure 1:
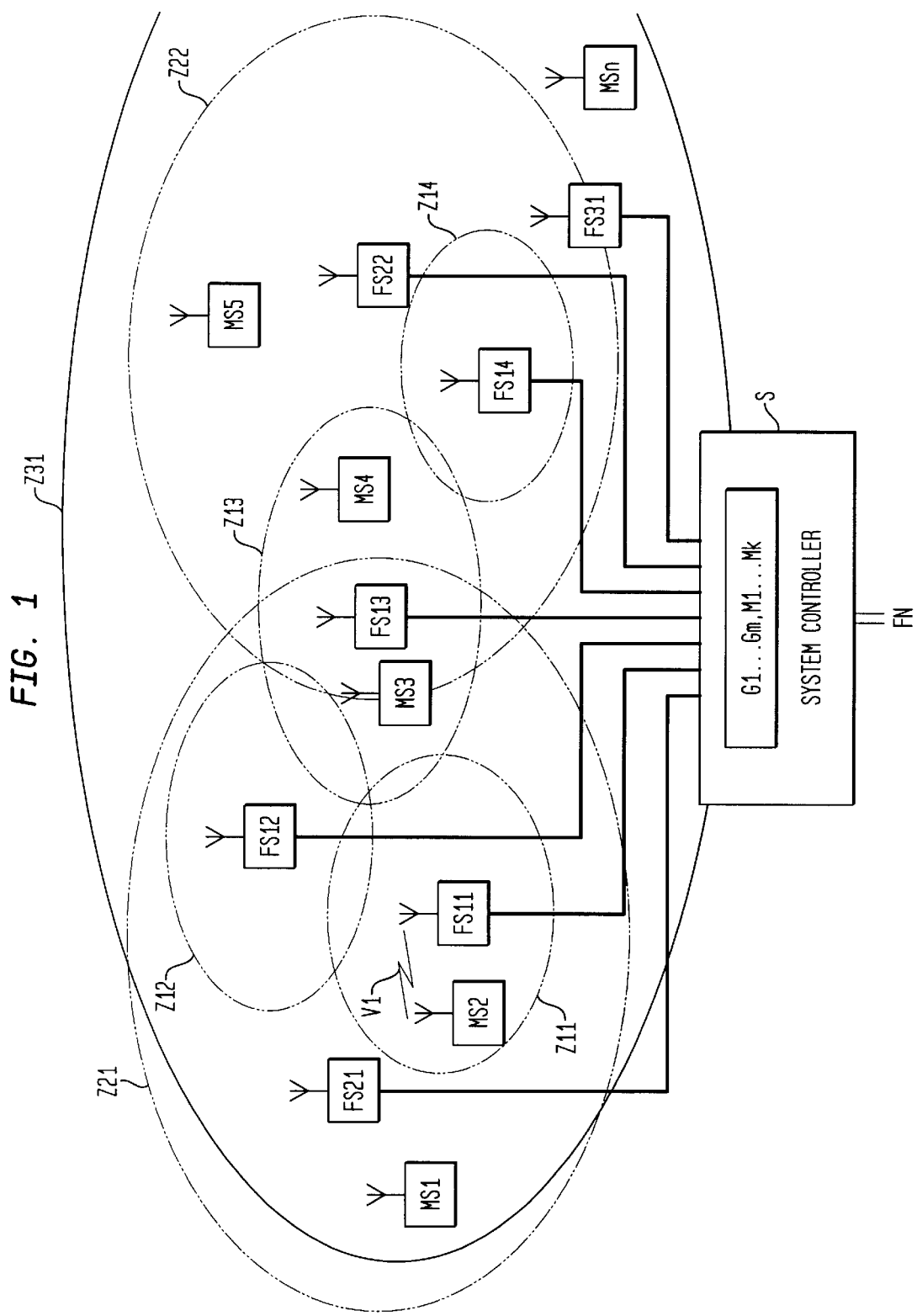
FIG. 1 shows a first illustrative embodiment of a radio communications system comprising central call handover unit.

FIG. 1 shows a mobile radio communications system comprising three hierarchical layers. For example, base stations FS11, FS12, FS13, FS14 which cover the respective radio coverage areas Z11, Z12, Z13, Z14, so-called microcells, are assigned to the bottom layer of the cell hierarchy. The base stations FS21, FS22 which cover radio coverage areas Z21, Z22, so-called macrocells, are assigned to a medium layer of the cell hierarchy, whereas the base station FS31 which has an assigned radio coverage area Z31 (so-called umbrella cell) forms part of the top layer of the cell hierarchy. The base stations FS11, FS12, FS13, FS14, FS21, FS22, FS31 are connected to a controller S which has call handover facilities G1 . . . Gm as well as further units M1 . . . Mk for handing over a call. In a GSM mobile radio communications system, the controller S corresponds to the so-termed base station controller BSC. The controller S is additionally connected to a fixed network FN of a telephone system. In the mobile radio communications system the mobile stations MS1, MS2 . . . MSn move about.

As a result of the hierarchical structure of the mobile radio communications system, the radio coverage areas may be covered multiple times. A mobile station MS1 . . . MSn moving about in the mobile radio communications system shown in FIG. 1 consequently has a possibility, depending on its location, to set up a call to base stations of different cell hierarchies. For the mobile radio communications system to handle a high traffic load effectively with different movement profiles of the mobile radio subscribers, in conjunction with different coverage areas of individual base stations realized in the respective mobile radio communications network, the slowly moving mobile stations, for example, hand-held mobile telephones within the town area, are assigned to the radio cells Z11, Z12, Z13, Z14 of the hierarchical bottom cell layer, whereas the base stations FS21, FS22 of the medium hierarchical layer and the base station FS31 of the hierarchical top layer are to be used for covering the fast moving or very fast moving mobile stations, for example, for covering radio cells within the range of motorways or high-speed trains. This is to avoid frequent handovers for fast moving mobile stations, which handovers would be necessary in the hierarchical bottom cell layer with fast moving mobile stations. This will be further explained in the following by means of an example. If the mobile station MS2 shown in FIG. 1 is situated, for example, in the radio coverage area Z11 of the base station FS11, and if there is a call V1 between the mobile station MS2 and the base station FS11, the time during which the mobile station MS2 is located in the radio coverage area of the microcell FS11 with which it is being linked is determined by the units M1 . . . Mk included in the system controller S. If there is a request for a call handover while the time is being measured, which request may be caused by a diminishing signal field strength, the controller S determines via units M1 . . . Mk whether the duration of the call between the mobile station MS2 and the base station FS11 exceeds a predefinable value. If this is the case, there is first a possibility to maintain the call, for example, by accordingly managing the transmitter power of the respective mobile station and base station. If this is not possible, i.e. if the measured call duration exceeds the predefined value, the call is handed over by the base station FS11 to a destination cell which has the same cell hierarchy, insofar as this destination cell is available.

If the comparison of the measured call duration with the predefinable length of time proves that the duration of the call with the base station FS11 was insufficient, i.e. the measured time length falls short of the predefinable value, the call is handed over to a destination cell of a higher hierarchy layer, for example, in the present case to the base station FS21 of the radio coverage area Z21. As a result, a simple and efficient criterion is provided for the handover of a call from the radio coverage area Z1j of a base station FS1j i.e. a base station of the bottom layer of the cell hierarchy.

A similar procedure may be performed by a time-triggered handover of a call also in reverse hierarchical order i.e. if there is a call to a base station FS of the hierarchical top cell layer. In the following this will be further explained by means of an example of a radio call held between the mobile station MS5 and the base station FS31. Initially, there is established whether the mobile station MS5 is located inside the radio coverage area of a base station of a lower-order cell layer than the current cell Z31. In the present example this is the cell Z22 of the base station FS22. A time measurement is started from this instant onwards, having for its aim to establish whether the dwell time of the mobile station MS5 in the cell Z22 is sufficient, i.e. whether the dwell time exceeds a predefinable value. If it does, the call is handed down to the destination cell Z22 i.e. to a destination cell of a lower order in the cell hierarchy.

If the mobile station MS5 moves, for example, in the direction of the radio coverage area Z13 of the base station FS13, there is also established in this case how long the dwell time of the mobile station MS5 inside the radio coverage area Z13 is, and if the dwell time exceeds the predefined value, the call is again handed over to the cell Z13, in other cases the call to the current cell is maintained, or the call is handed over to a cell of the same hierarchy, for example, to the radio coverage area Z21 of the base station FS21.

The mobile radio communications system shown in FIG. 1 has, for example, three layers of cell hierarchy, but the invention is, in essence, also applicable to mobile radio communications systems that have two or an arbitrary number of hierarchical cell layers.

Figure 2:
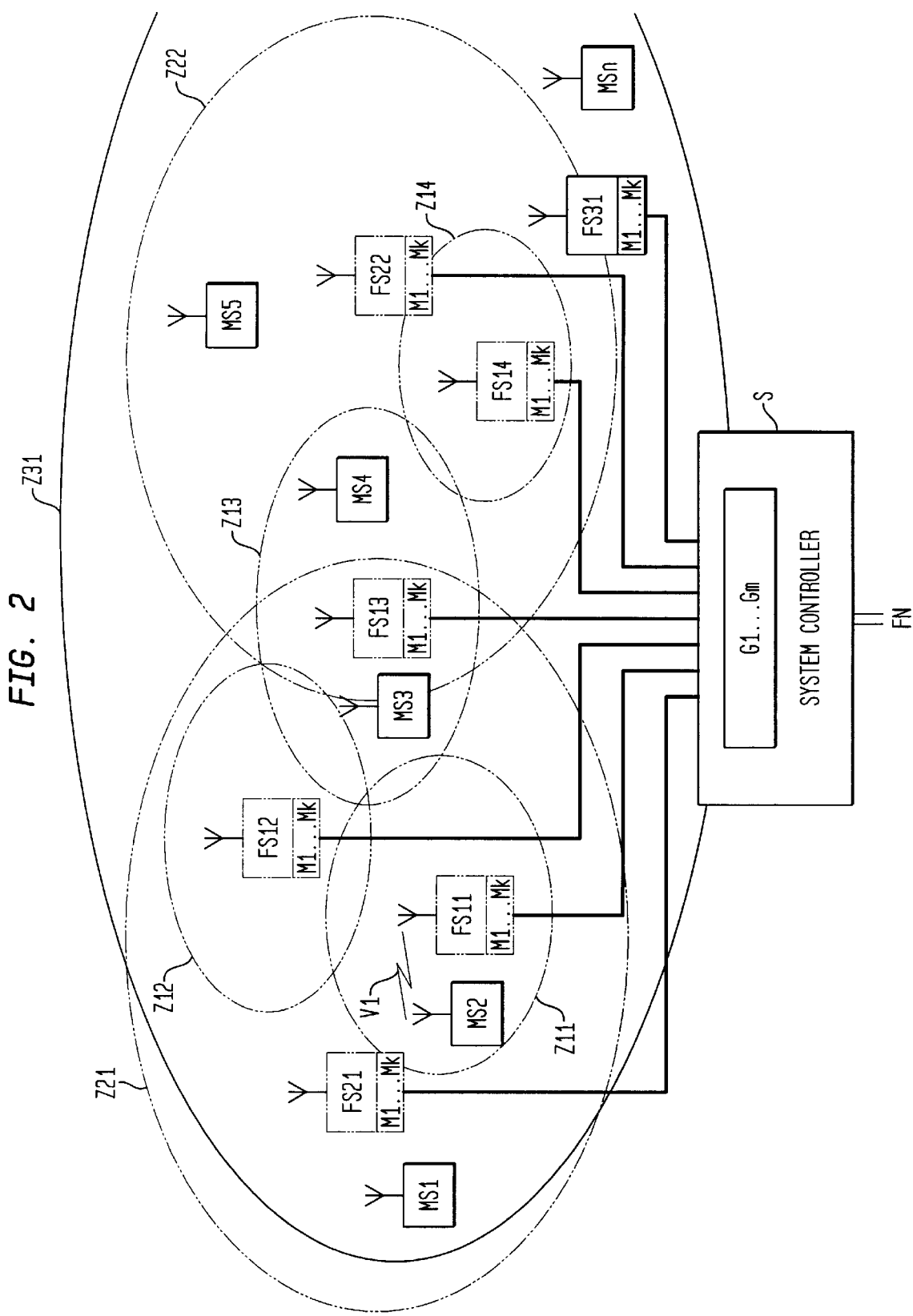
FIG. 2 shows a second illustrative embodiment of a radio communications system comprising decentralized call handover unit.

FIG. 2 shows a radio communications system which corresponds, in essence, to the radio communications system shown in FIG. 1. Only the units M1 . . . Mk for handing over a call V1 . . . Vn in dependence on the dwell time or the call duration are not included in the system controller S in the illustrative embodiment shown in FIG. 2, but are arranged decentrally in the base stations FS. In a GSM mobile radio system, for example, the units M1 . . . Mk are near to or inside the so-called base station transceiver BTS. For the rest, the mobile radio communications system shown in FIG. 2 works similarly to the radio communications system described with reference to FIG. 1.

Figure 3:
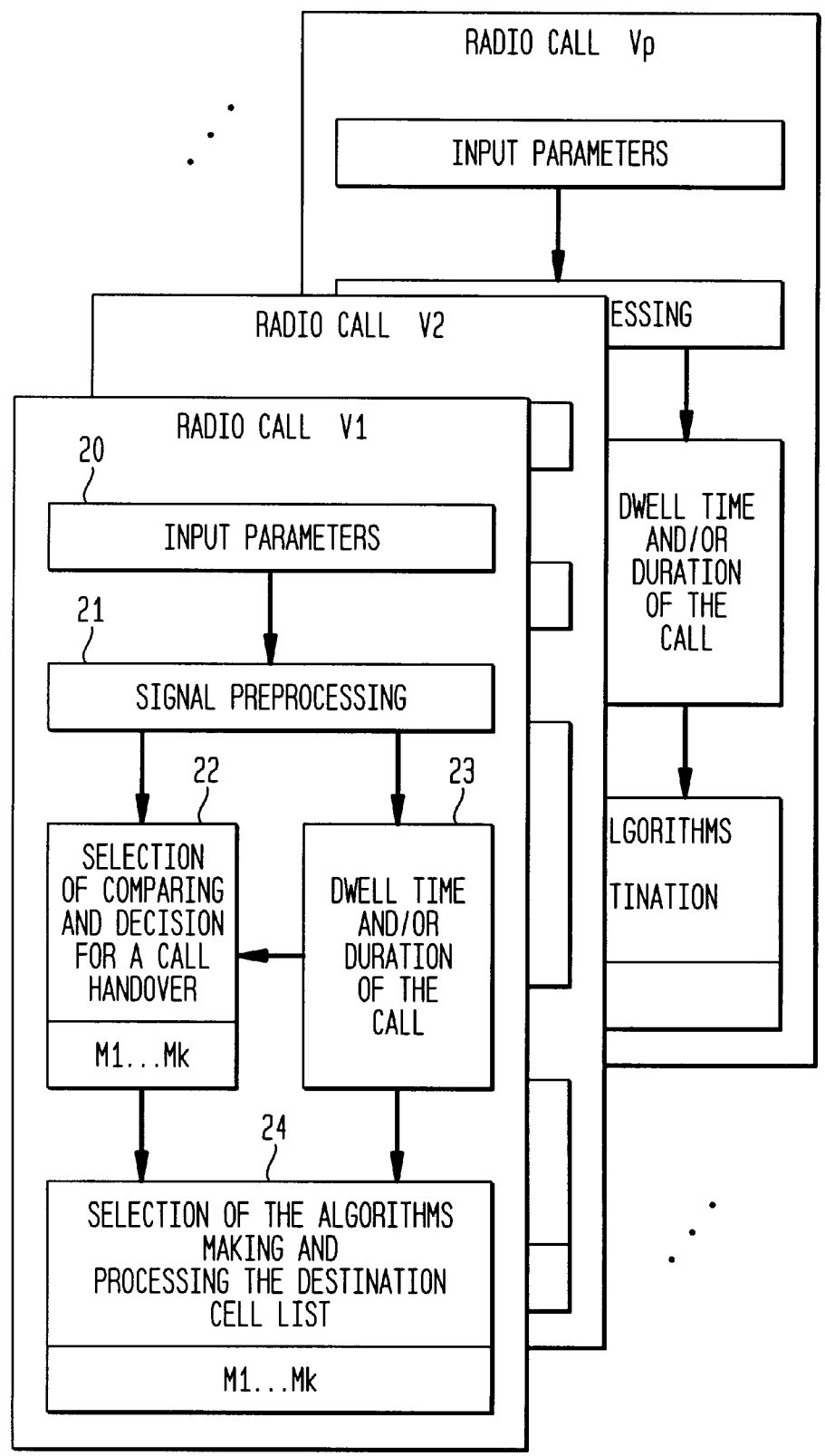
FIG. 3 shows a block circuit diagram for the procedure of a call handover.

FIG. 3 shows a block circuit diagram whose task is to clarify decision making for handing over a call. The block circuit diagram will be described by way of example with reference to the radio call V1. During an existing radio call, input parameters collected in block 20 are prepared in the base station (for example, in the base station transceiver BTS of a GSM base station), for example, receive level of the base station of the serving cell and of the adjacent cells, quality and distance parameters of the call between mobile station and base station of the serving cell in a signal preprocessing block 21. The input parameters thus prepared are used as input values for the further processing blocks 22, 23, 24 which include decision algorithms for handing over the radio call V1. When the units M1 . . . Mk are arranged centrally in the controller S, these processing blocks 22, 23, 24 are included in the base station controller BSC (compare FIG. 1), and when arranged decentrally, the units M1 . . . Mk are arranged in or near to the base stations FS, for example, in the base station transceiver. In dependence on the dwell time established in block 22 and/or duration of the call, there is in block 23 a selection of the comparison and decision algorithms for handing over the call and/or other measures connected herewith for controlling the radio call, such as, for example, an appropriate power control concept (power control management). The results of blocks 23 and 22 are then used as a basis for the selection of the algorithms for making up and processing the so-called destination cell list, which selection is made in block 24 i.e. the order of the cell hierarchies when the destination cell list is processed.

Figure 4:
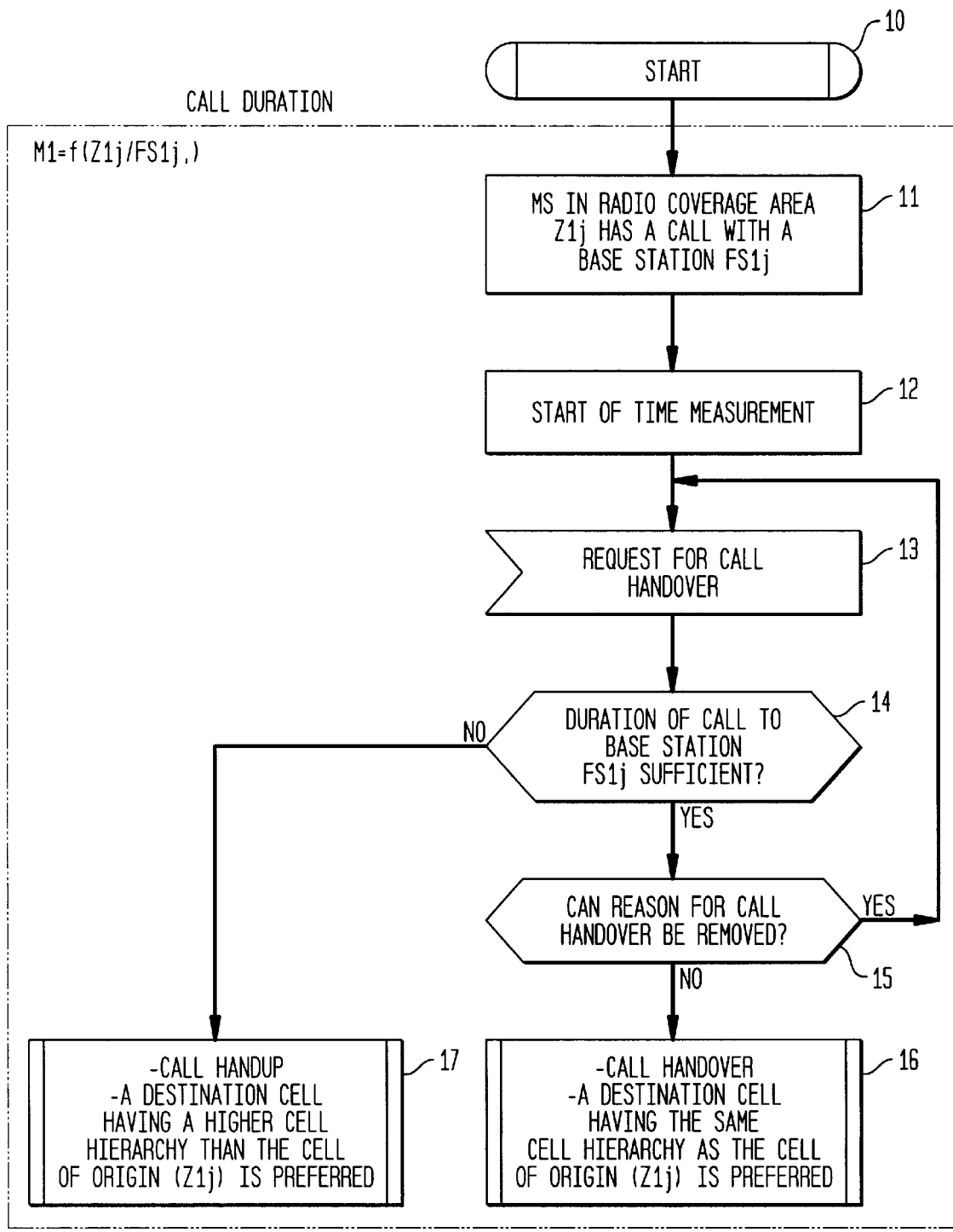
FIG. 4 shows a flow chart for the time-controlled handing down of an existing call to a base station of the bottom layer of the cell hierarchy.

FIG. 4 shows a flow chart for the time-controlled handover of a call from the radio coverage area Z1j of a base station FS1j which belongs to the bottom layer of the cell hierarchy. The base stations FS1j are, for example, the base stations FS11, FS12, FS13, FS14 of the mobile radio communications systems shown in FIGS. 1 and 2, with the respective radio coverage areas Z1j=Z11, Z12, Z13, Z14. After a start, predefined in block 10, which start is effected, for example, by opening a radio link between a mobile station and a base station of the hierarchical bottom cell layer, there is initially established by the units M1 . . . Mk whether the mobile station is located in the radio coverage area Z1j and whether a call exists to a base station FS1j of the hierarchical bottom cell layer. If this is the case, a time measurement is started in block 12. If during this time measurement a request is made for handing over the call, for example, as a result of predefinable criterions, for example, layer, distance or quality criterions, a check is made in block 14 whether the duration of the call i.e. the time from the start of the time measurement till the request for the call handover, exceeds a certain limit value (predefinable second value) by, for example, 15 to 30 seconds. If it does, a check is made in block 15 whether the reason for the call handover can be removed. This may be achieved, for example, by increasing the transmitter power. If such a power management is still possible, the time measuring loop is again passed through. If it is no longer possible to eliminate the call handover in any way possible, a handover of the call to a destination cell of the same cell hierarchy as the original destination cell is effected in block 16 insofar as the original destination cell is available. If the check of the duration of the call to the base station FS1j in block 14 proves that the call duration falls short of the predefinable comparative value, the call is handed over to a destination cell of a higher cell hierarchy insofar as such a cell is available. With the proposed criterions for determining the call duration, it is simple to produce a criterion with which a highly suitable and effective assignment of the mobile stations to the separate radio cell hierarchies can be effected. Costly measuring devices for determining the speed are not necessary. The units M1 . . . Mk for handing over a call may be arranged both centrally in the system controller as has already been shown in FIGS. 1 and 2, and decentrally in the base station. In mobile radio communications systems having more than two hierarchical layers, the predefinable (second) value i.e. the limit value to be inquired in block 14, can be predefined differently for different cell hierarchies.

Figure 5:
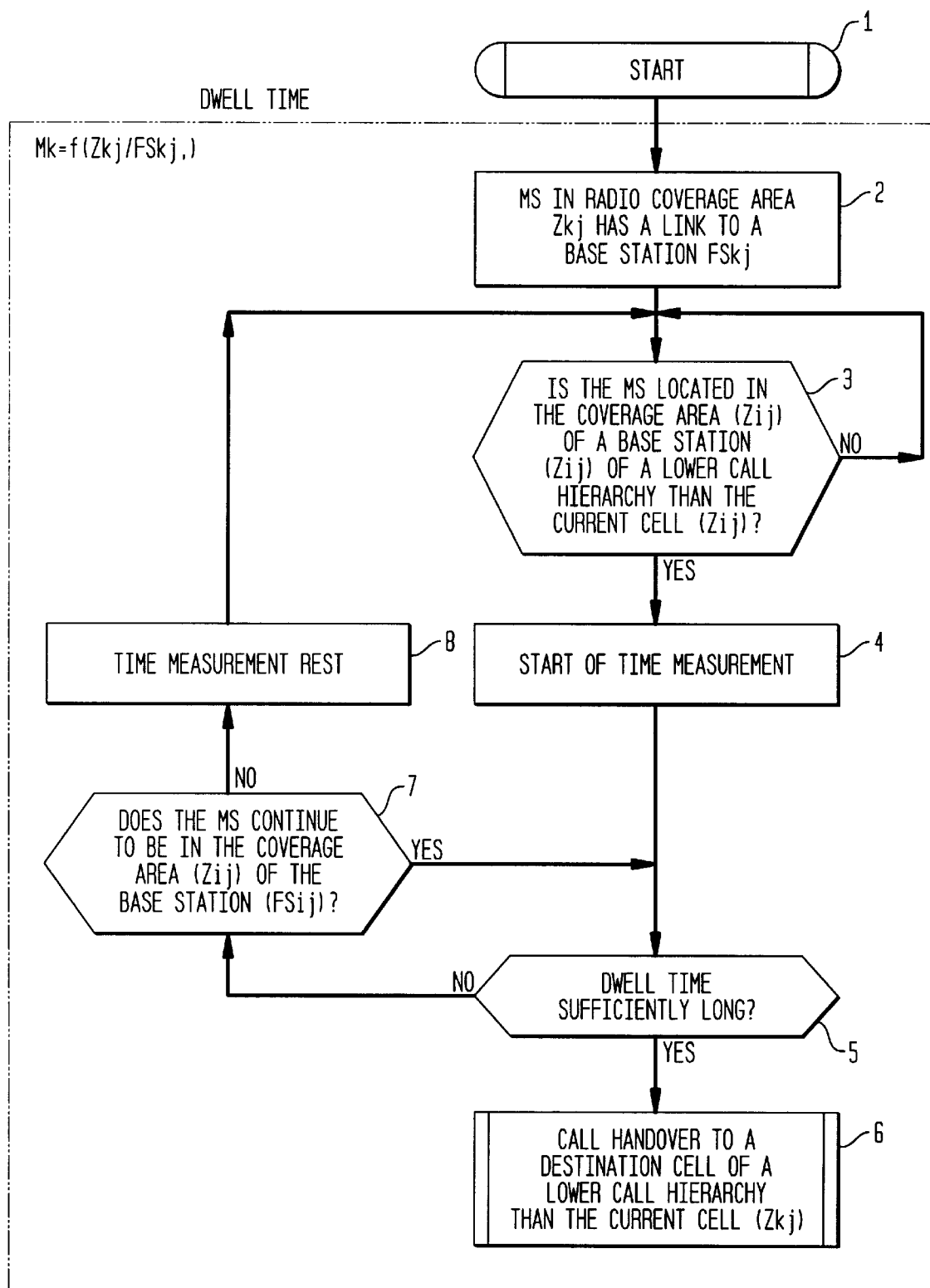
FIG. 5 shows a flow chart for the time-triggered handing up of an existing call to a base station of the top layer of the cell hierarchy.

FIG. 5 shows a flow chart for a time-triggered call handover from the coverage area ZKj of a base station FSKj which belongs to the top layer of the cell hierarchy. In the case of the mobile radio communications system shown in FIGS. 1 and 2, this base station is the base station FS31 which covers the radio coverage area Z31. In the mobile radio communications system in which only two hierarchical layers occur, the base station may also be the base station FS21 or FS22 of the radio cells Z21 and Z22 (compare FIG. 1, FIG. 2). In the flow chart shown in FIG. 5, after the start shown in block 1, which start is again effected by the opening of a link between a mobile station and the base station, a test is made in block 2 whether the mobile station is located in the radio coverage area of a base station of the top cell layer, and also maintains a link to this base station. If so, a test is made in block 3 whether the mobile station is also located in a radio coverage area of a base station that has a lower-order cell layer than the current cell. If so, the time measurement is started in block 4, and in block 5 a test is made whether the mobile station is still located in the radio coverage area that has the lower-order cell layer even after the time measurement has been made, i.e. whether the dwell time is sufficiently long (=whether the predefinable first limit value is exceeded). If this is the case, the call is handed over to a destination cell that has a lower hierarchical layer than the current cell (compare block 6). If the dwell time in the radio coverage area of the lower-order cell layer is insufficiently long, a test is made in block 7 whether the mobile station continues to be located in the radio coverage area of the base station that has the lower-order cell layer. If this is the case, a test is made whether, after the time measurement is started in block 4, the dwell time is further sufficiently long (compare block 5). If the mobile station is no longer located in the coverage area of the radio station of the lower-order cell layer, the time measurement is reset in block 8 and the beginning of block 3 is jumped back to i.e. a test is again made whether the mobile station is located in the radio coverage area of a base station that has a lower-order cell layer than the current cell. In mobile radio communications systems which have more than two hierarchical layers, the predefinable (first) value i.e. the limit value which can be inquired in block 5 can also be predefined differently for different cell hierarchies.

In the mobile radio communications system shown in FIGS. 1 and 2, in which there are more than two hierarchical layers, in addition to the flow charts described with reference to FIGS. 4 and 5, that is to say, in addition to the handdown of a call from a base station that belongs to the top layer of the cell hierarchy to a base station of a hierarchical cell layer below that, and also a handup, it is possible to provide a controller which includes a combination of the two flow charts of FIGS. 4 and 5. For this purpose, a flow chart is conceivable which features both the time-controlled and time-triggered handover of a call from the coverage area Zij of a base station FSij which belongs neither to the bottom nor to the top layer of the cell hierarchy with 1<i <k, where 1 is the bottom layer and k the hierarchical top cell layer. The handover of a call from the coverage area Zij of a base station FSij which belongs neither to the bottom nor to the top layer of the cell hierarchy may then be realized by a mixed complex application of the flow charts shown in the FIGS. 4 and 5.

What is claimed is:

1. A mobile radio communication system, comprising:
   a plurality of base stations; and
   call hand over units controlling which of said base stations services a call from a mobile station, said call hand over units deciding whether to hand over said call from a first base station to an available second base station or an available third base station based exclusively on a duration of said call regardless of a speed of said mobile station,
   wherein said first base station and said available second base station serve first level cells, and said available third base station serves a second level cell, which is larger than and overlaps at least a portion of said first level cells.

2. The system of claim 1, wherein when deciding whether to hand over said call from said first base station to said available second base station, said call hand over units hand over said call to said available third base station when said duration of said call is less than a predetermined value.

3. The system of claim 1, wherein said hand over units are located in a controller connected to said first, available second and available third base stations.

4. The system of claim 1, wherein said first, available second and available third base stations include said hand over units.

5. A mobile radio communication system, comprising:
   a plurality of base stations; and
   call hand over units controlling which of said base stations services a call from a mobile station, said call hand over units deciding whether to hand over said call from a first base station to an available second base station based exclusively on a length of time said mobile station has been within a coverage area of said available second base station regardless of a speed of said mobile station,
   wherein said available second base station serves a first level cell, and said first base station serves a second level cell, which is larger than and overlaps at least a portion of said first level cell.

6. The system of claim 5, wherein said call hand over units hand over said call to said available second base station when said length of time reaches a predetermined value.

7. The system of claim 6, wherein said hand over units begin measuring said length of time after determining that said mobile station falls with a coverage area of said first base station and said coverage area of said available second base station.

8. The system of claim 7, wherein said call handover units reset said length of time if said mobile station no longer falls within said coverage areas of said first and said available second base stations.

9. The system of claim 5, wherein said hand over units are located in a controller connected to said first base station and said available second base station.

10. The system of claim 5, wherein said first base station and said available second base station include said hand over units.

11. A method of mobile radio communication, comprising:
    (a) measuring a duration of a call being made by a mobile station;
    (b) beginning a call hand over process to decide whether to hand over said call from a first base station to an available second base station or an available third base station based exclusively on said duration of said call regardless of a speed at said mobile station,
    wherein said first base station and said available second base station serve first level cells, and said available third base station serves a second level cell, which is larger than and overlaps at least a portion of said first level cells.

12. The method of claim 11, wherein said step (b) hands said call over to said third base station when said duration of said call is less than a predetermined value.

13. A method of mobile radio communication, comprising:
    (a) measuring a length of time a mobile station has been in a coverage area of an available first base station; and
    (b) handing a call over from a second base station to said available first base station based exclusively on said length of time said mobile station has been within said coverage area of said available first base station regardless of a speed of said mobile station,
    wherein said available first base station serves a first level cell, and said second base station serves a second level cell, which is larger than and overlaps at least a portion of said first level cell.

14. The method of claim 13, wherein said step (b) hands said call over to said first base station when said length of time reaches a predetermined value.

15. The method of claim 13, prior to said step (a), further comprising:
    (c) determining whether said mobile station falls within said coverage area of said first base station and a coverage area of said second base station; and wherein
    said step (a) begins measuring said length of time said mobile station has been in said coverage area of said first base station when said step (c) determines that said mobile station falls within said coverage area of said first base station and said coverage area of said second base station.

16. The method of claim 15, further comprising:
    (e) resetting said length of time if said mobile station no longer falls within said coverage areas of said first and second base stations.

\* \* \* \* \*